United States Patent [19]

Perazza

[11] Patent Number: 5,326,959
[45] Date of Patent: Jul. 5, 1994

[54] AUTOMATED CUSTOMER INITIATED ENTRY REMITTANCE PROCESSING SYSTEM

[76] Inventor: Justin J. Perazza, 1 Stag's Leap Ct., Vincentown, N.J. 08088-9041

[21] Appl. No.: 925,574

[22] Filed: Aug. 4, 1992

[51] Int. Cl.⁵ .................................................. G06F 15/30
[52] U.S. Cl. ................................... 235/379; 235/487; 902/24; 364/408
[58] Field of Search .................. 235/487, 379; 902/24; 364/401, 406, 408

[56] References Cited

U.S. PATENT DOCUMENTS

| | | | |
|---|---|---|---|
| 4,644,144 | 2/1987 | Chandek et al. | 235/487 |
| 4,728,784 | 3/1988 | Stewart | 235/487 |
| 4,823,264 | 4/1989 | Deming | 902/24 |
| 4,934,587 | 6/1990 | McNabb | 235/487 |
| 4,960,981 | 10/1990 | Benton et al. | 235/379 |
| 5,007,084 | 4/1991 | Materna et al. | 235/379 |
| 5,186,334 | 2/1993 | Fukudome et al. | 235/379 |

Primary Examiner—Davis L. Willis
Assistant Examiner—Yu S. Lin
Attorney, Agent, or Firm—Robert S. Bramson

[57] ABSTRACT

A computer-controlled funds processing and remittance processing system, for use by individual, business and other bank customers. The system eliminates the problems associated with batch processing of remittances and remittance advices in lockbox systems. Each participating bank receives, from each participating customer, identifying information regarding bills that are to be paid for that customer with the automated system. After initially collecting all necessary data regarding a participating customer's bills, the bank produces a paper form, which is manually completed by the customer, on a periodic basis. The customer manually inserts the amount to be paid for each bill being processed by the system, opposite pre-printed indicia indicating the identity of the payee. The resulting customer payment instruction document is delivered to the bank, and is optically scanned, to read the specific amounts to be paid for the respective bills. The bank has stored, in computer memory, the names and other identifying information regarding the billers for each customer. Once the customer payment instruction is received and scanned by the bank, which can occur on the day it is received, funds can automatically and promptly be transferred, together with appropriate customer identifying information, to each biller's designated bank and its application, using conventional clearinghouse systems. The invention includes a mailing envelope carrier for the information-containing document.

14 Claims, 4 Drawing Sheets

AUTOMATED CUSTOMER INITIATED ENTRY REMITTANCE PROCESSING SYSTEM

BACKGROUND OF THE INVENTION

1. Field of the Invention

This invention relates to automated banking systems and means. In particular, the invention relates to a Customer Initiated Entry system, in which the Bill Payer periodically completes, on a sheet of paper, information in machine-readable form regarding Bills required to be paid and transfers that form to the Payer's Bank. The sheet of paper is optically scanned, the relevant payment information read, and the transaction for transfer of data is then automatically handled by a suitable clearinghouse with prompt transfer of funds to the Biller.

2. Glossary of Terms

As used herein, the following terms shall have the designated meanings.

"Application" means a Biller's computer program, which records accounts receivable and payments for its Bill Payers.

"Automated Clearing House" or "ACH" means a substantially paperless automatic settlement mechanism by which one bank can transfer funds quickly and electronically to another bank through one or more electronic clearinghouses. There are many such clearinghouses; they may be quasi-public (created by a group of banks) or private.

"Bill" means "Remittance Advice" or "Bill", as defined below.

"Bill Payer" means an individual, organization or business paying a Bill to a Biller.

"Biller" means a creditor, which sends periodic Bills to its customers or debtors for payment. A Biller may be a mortgage company, credit card company, public utility or department store chain, by way of example.

"Collection Float" means the time for funds, once credited to a Biller's account, to be verified for availability from the Payer's Bank.

"Customer Initiated Entry" or "CIE" means an automated or semi-automated system in which a Bill Payer may use a rotary telephone (voice input), a touch-tone telephone (voice or key input) or a computer (key input) to communicate to the payer's bank by voice (in the two former events) or keystroke (in the two latter events) to create instructions to make a payment to a Biller.

"Customer Payment Instruction" or "CPI" means a document which is preprinted with Bill Payer identification and a list of Pre-Registered Billers and includes an area for the machine readable, manual designation or insertion of (1) a sum of money for each such Biller, and (2) optionally, a Designated Date.

"Designated Date" means a date designated by a Bill Payer for payment of a bill to a Biller. It may be date specific, e.g., the 15th of each month, or date nonspecific, e.g., immediately. For example, a Biller may designate the first of the month as a due date, but will accept payment, without penalty, up to the tenth of the month. The Bill Payer will then prefer to specify the tenth of the month as the Designated Date.

"Electronic Remittance" means electronic transfer of information to effect payment of a Bill by a Bill Payer to a Biller with an associated credit transaction to reflect the payment for the Bill Payer's account with the Biller.

"Electronic Remittance Instruction" means an Electronic Remittance including the following information:

1. The Bill Payer's account number with the Biller;
2. Other nominal data required for the Biller to process a Remittance, such as a transaction number;
3. The amount of the Remittance; and
4. Any applicable data conventions, to permit the data to be recognized and processed. The data conventions (or protocols) are standard, commonly accepted definitions, which may be found, for example, in the *Operating Guidelines of the Mid-Atlantic Clearing House Association and The National Automated Clearing House Association.*

"Lockbox" means a system of Bill collection in which a Biller designates a bank or other institution as its agent and addressee for receiving payments from Bill Payers and for immediately depositing them, upon receipt, into the Biller3 s account and to collect these funds from the Payer's Bank, and processing the Remittance Advice for the transaction. In some instances, the Biller may act as its own Lockbox agency.

"Mail Float" means the time for a Bill Payer's check, when mailed, to be delivered to the Biller's Lockbox bank.

"Payer's Bank" means a bank where a Bill Payer has an account.

"Preauthorized Payment" means a system whereby a Bill Payer gives the Biller written authorization and instructions to allow the Biller, through its bank, to routinely (usually monthly) automatically deduct predetermined sums from a Bill Payer's account for the credit of the Biller through ACH.

"Pre-Register" means provide a Payer's Bank with the following minimum information for a Biller, as to a Bill Payer:

a. Bank routing number (Biller's bank, Federal Reserve district and account number);
b. Biller's account number at the Biller's bank;
c. Bill Payer's account number;
d. Bill payment period (e.g., month, calendar quarter, etc.);
e. Bill payment due date (e.g., the tenth of each month);
f. Other nominal remittance processing data required for the Biller to process the remittance (for example, transaction number); and
g. Applicable data conventions (the protocols that are required to construct the applicable processing record).

"Remittance" means the act of sending money in payment of an obligation or the money so sent or transmitted.

"Remittance Advice" or "Bill" is the portion of a biller's bill or statement for a bill payer that is to be returned by the biller. It identifies the biller, the bill payer's account number, the due date and amount due, and usually includes a space for the bill payer to insert the amount of the enclosed payment.

3. Prior Art

Automated Clearing Houses are well-known and well-established in the banking field. Although these have been moderately successful, they have not captured the bulk of the Bill Payer check processing business, which is still handled inefficiently using Lockbox systems.

Some Customer Initiated Entry services are currently available, using telephones or computer data entry as means for achieving semi-automated bill payment by the Bill Payer. These have received limited acceptance.

Thus, the prior art includes systems whereby a Payer's Bank may automatically effect fund transfers as a debit to a Bill Payer's account and a credit to a Biller of that bank customer at a remote bank. However, these systems have limited appeal and have not yet obtained widespread acceptance and use.

For Bill payments which are regular and fixed (such as a monthly mortgage or car loan payment), it is possible to provide the Payer's Bank with Preauthorized Payment instructions, so that, on a given date, the Payer's Bank will automatically debit the Bill Payer's account with a pre-determined amount. This amount can then be transferred and credited to the Biller's account automatically, in accordance with the predetermined approval and instructions.

U.S. Pat. Nos. 4,927,071 to Wood; 3,576,972 to Wood; 4,128,202 to Buros; and 3,531,628 to White, Jr. show document carriers for checks having transparent windows.

BACKGROUND OF THE INVENTION

As noted above, Automated Clearing House systems are available for the automated transfer of funds from one bank, at which a Bill Payer has an account, to the same or another bank, anywhere in the world, at which a Biller maintains an account. However, these systems are not widely used by individual Bill Payers. They tend to be used primarily by large corporations.

The availability of Customer Initiated Entry by using telephones or computers has provided some opportunity for semiautomated Bill payment, but this has not been widely accepted throughout the Bill Payer community.

It is common for Billers to use Lockbox systems to collect Remittances. In a Lockbox system, the Biller arranges to use the services of a financial institution or contractor to collect Remittances from its customers. The financial institution or contractor or the Biller itself sets up a post office box to obtain custody of all payments. Each payment letter contains a Remittance (check or money order) and Remittance Advice (Bill) of the Biller. It then processes those payments on behalf of the Biller. These processes are to (1) collect on the Bill Payer's checks (Remittances) against the Payer's Bank on which the checks are drawn, through check clearing networks and/or the Federal Reserve, (2) read each Remittance Advice to determine which account is to be credited in the Biller's accounts receivable or collection system, and (3) effect the transaction to that system to credit the Biller's account in the proper amount for each Bill Payer. The Remittances and Remittance Advices are processed in the batch method of data processing. This means that batches of checks and corresponding Remittance Advices are handled in separate groups.

There are many different procedures in use to effect batch Lockbox processing. A typical batch processing operation in a highly automated environment would be as follows:

1. Manually sort out checks without Remittance Advices, Remittance Advices without checks, and checks received with Remittance Advices and Bill Payer's correspondence. These items are sent to the Biller for manual processing.

2. Assemble checks and Remittance Advices in groups of 100 to 500 items, ensuring that each applicable Remittance Advice precedes the corresponding check.

3. Place a specific batch control header and trailer advice before and after (respectively) the batched Remittance Advices and checks.

4. Input the batch into a high-speed transport.

5.
   (a) Read the headers.
   (b) Read in the Remittance amount from a scan line on the Remittance Advice which has OCR or MICR characters.
   (c) Read in the applicable check (which has MICR characters).
   (d) Record on each Remittance Advice and check in the batch, a sequential number.
   (e) Take an image of the check and Remittance Advice and place them in storage of a computer in sequential order.

6. Separate by batch checks and Remittance Advices, keeping their sequential order intact for the batch.

7. Manually remove from batches unreadable Remittance Advices and checks and adjust the data base.

8. Send images of each sequential Remittance Advice and check to a terminal or monitor.

9. Visually read each check and key the check amount into the sequential database record for the particular Remittance Advice.

10. If the amount keyed in agrees with the OCR or MICR read amount from the scan line of the Remittance Advice, the data base is so marked and there is a processable item.

11. If the amount keyed in does not agree with the amount on the Remittance Advice scan line, the keying program prompts the item to be re-keyed.

12. If the re-keyed amount agrees with the amount on the scan line of the Remittance Advice, the data base is so marked and there is a processable record.

13. If after re-keying there is still not a match to the scan line of the Remittance Advice:
   a. The items may or may not be processable, depending on the payment acceptance parameters of the Biller in the payment processing software of the Lockbox operator.
   b. If the item is deemed to be unprocessable, the data base is so marked for the particular Remittance Advice and check.
   c. If the item is deemed to be processable, then the data base is so marked for the particular Remittance Advice and check.

14. Unprocessable items may be manually or programmatically removed from the respective batches and forwarded to the Biller for manual processing.

15. For processable items:
   a. The checks for the particular batch are input into a computer-controlled MICR encoder.
   b. From the amounts keyed and accepted, the checks are MICR-encoded.
   c. The encoded checks are then processed through the normal check clearing (batch) processes in place for the bank.
   d. An interface file and reports are created for the Biller's use (from scan/MICR information on the Remittance Advice) in the Biller's accounts receivable collection system/application.

16. The images of or physical Remittance Advices are returned to the Biller. The Lockbox operator keeps a copy of a data/image for its records.

There are many, less sophisticated, ways to do Lockbox processing and this is just an example of one way.

As can be seen from the above description, Lockbox systems are cumbersome, expensive and time-consuming and the Mail Float can be several days or more. The cost to the Biller for handling a Remittance and Remittance Advice in a Lockbox System is substantial, because of the manual handling and potential for human error, which requires additional manual handling. The cost for these expensive handling procedures is avoided and the check processing cost is reduced significantly by using the process of this invention.

SUMMARY OF THE INVENTION

This invention utilizes the high-speed, low-cost, computer-based capabilities of Automated Clearing House systems, and permits the Payer's Bank (usually located in the Bill Payer's local community) to automatically scan, read and process a Customer Payment Instruction, as more fully described below. Since the Bill Payer usually sends or delivers the CPI directly to his, her or its local bank, the mail time for delivery of the payment is usually less than the mail time for delivery to a remote Lockbox, and is the same day if done by personal delivery.

Once the Payer's Bank receives the Customer Payment Instruction, it can manually open the special envelope of this invention by removing the window closure flap to expose the CPI. The envelopes of the invention are designed for ease and speed of use, so that the Customer Payment Instruction may be read promptly by a suitable optical character reader. If the Payer's Bank volume of CPIs is sufficient, mechanical opening means can be used, but the daily volume per local bank branch will usually permit manual opening.

In the preferred form of this invention, the CPI processing and reading is handled by relatively inexpensive, low-capacity, manual or semi-automatic equipment, located at the Bill Payer's local branch of the Payer's Bank. This is called a "distributed" processing system, in which CPI processing is done at local bank branches. This is desirable because:

1. Branch bank personnel have substantial quiet periods from time to time during the day. At these quiet times, tellers and other personnel can open envelopes and manually feed the CPIs into the scanning and processing equipment of the invention; and 2. Some customers will be more likely to come to the branch to deliver their CPIs. This increased traffic will increase the likelihood of the customer doing other business with the bank.

On the other hand, it is within the purview of this invention to collect the CPIs at one or more central locations and process the CPIs in a highly automated manner.

The CPI is one or more sheets of paper. Each CPI contains a listing of each of the Billers that the Bill Payer has designated to the Payer's Bank, by Pre-Registration, for use in the system of this invention. The CPI provides space for the Bill Payer to designate manually, in machine-readable form, two things, i.e., whether each listed Bill is to be paid on the Designated Date or immediately, and the amount of the Bill to be paid.

Bill payments are usually due on a particular date, depending upon the Biller, such as the 10th of each month, and this may be pre-printed on the Customer Payment Instruction, in which event the Bill Payer may use this as the Designated Date. Then only one manual entry (the payment amount) is required. On the other hand, the Bill Payer may designate both the Designated Date and Bill payment amount on the CPI.

The Payer's Bank may create the blank CPIs, using Pre-Registered information for each Biller, provided by or at the request of the Bill Payer. The Payer's Bank inputs and stores in its computer memory the Pre-Registered information for each Bill Payer, which is needed to pay all authorized Bills.

The Payer's Bank provides the Bill Payer with a set of CPIs for use as needed. Since most people and organizations pay their Bills at least monthly, it is expected that most Bill Payers will complete one or more CPIs once each month.

In the normal course of events, all that the Bill Payer using the CPI has to do is, once a month, review the Bills received from the various Billers, and, for each Biller, mark in the appropriate space on the CPI the machine-readable indicia which describe the amount of the Bill to be paid that month and the Designated Date, if applicable. Some Bills (mortgages, car loans, and the like) are fixed sums, payable each month, and each fixed amount can be Pre-Registered in the system of this invention, so that in these instances, at the option of the Payer's Bank, no information needs to be completed on the CPI, unless the Bill Payer wants to change the payment amount or the Designated Date.

Most Bills, however, such as credit card charges and utility bills, will vary monthly, and the Bill Payer must insert monthly on the CPI the specific amount of each Bill to be paid. Also, even if a fixed sum may be due, as on a car loan or mortgage, the Bill Payer may actually pay more or less than the amount due, and that payment would have to be specified. The completed CPI is then mailed or delivered in a suitable envelope to the Payer's Bank, preferably his, her or its local branch.

In the preferred embodiment of the invention, the envelope containing the CPI has a perforated or otherwise removable, opaque window, so that the CPI need not be removed from the envelope for processing, saving expensive envelope opening and sheet removing equipment or personnel time or both.

Once the CPI is exposed by removal of the opaque window in the envelope, the CPI is suitably transported beneath an optical scanner and character reader, which reads the machine-readable indicia which designate the Bill Payer account, which is preprinted in machine-readable form (such as bar-coded characters) on the CPI. The scanner also reads the individual Biller account number and the Bill payment amount set forth on the CPI opposite or proximate the respective Biller and when the Bill should be paid.

One or more Billers are Pre-Registered with the Payer's Bank, upon request of the Bill Payer. Thus, the Payer's Bank has all information which it needs to be able to transfer funds to and credit the Biller's account and to provide Remittance Instructions to the Biller's Application, while debiting the account of the Bill Payer accordingly. This information is input to the system from the CPI by an optical scanner. The CPI may then be printed with suitable identifying indicia, to create a permanent record of its receipt by the Payer's Bank. The image of the CPI may optionally be captured and stored in computer memory or on an optical disc for the records of the Payer's Bank.

Once the Payer's Bank has received the necessary information to pay Bills by scanning a CPI, it will create debits for the account of the Bill Payer for the respective amounts that it must transfer to Billers and appropriately create (1) credits to the accounts of the Billers for whom payment has been designated and (2) the electronic record containing each Electronic Remittance Instruction. These transfers can be effected substantially immediately, or on predetermined dates, in accordance with the Pre-Registration and CPI instructions of the Bill Payer.

Once the CPI is scanned and read, the records of the Bill Payer's instructions are electronically available to the Payer's Bank from a combination of (1) the Payer's Bank's computer memory and (2) the payment amount and Designated Date instructions of the Bill Payer. Fund and record transfers may then be made electronically from the Payer's Bank to the Biller's bank, using the quick settlement advantages of Automated Clearing House systems. Transaction records for a Designated Date which is later than the date of the Payer's Bank's receipt of the CPI can be warehoused in the memory of the Payer's Bank's computer and released from memory on a predetermined date to effect appropriate debit and credit and transaction record Electronic Remittance Instructions.

In this way, the Bill Payer may make Bill payments with a minimum of record-keeping, envelope-filling and postage-paying. He, she or it can simply fill out, on one or more individual CPIs, the amounts to be paid to the appropriate Billers, and, if desired, Designated Dates, and mail or otherwise deliver the CPIs to the Payer's Bank. Funds will then be automatically transferred on the Designated Date, and each Biller should receive the appropriate funds and Electronic Remittance Instructions through the ACH on or about the Designated Date. It is important that the Biller receive both the payment (funds) and Electronic Remittance Instructions. The payments are needed to fund its operations and the Electronic Remittance Instructions are needed, so that the so-called "application" (the computer program that maintains the financial records of the Biller for customer payments) can be input to credit the Bill Payer's account with the Biller with the amount of his, her or its payment. This also allows payment instructions to be created electronically (by optical scanning) from a relatively error-free source (the use of bar code or similar machine-readable source on the CPI). Once the payment instruction is created, it can be used electronically to debit the Bill Payer's account and, through the Automated Clearing House, credit the Biller's account and transfer this information to the application. There is almost no possibility of error in this process, because of its automated, electronic nature. Of course, electronic systems are not necessarily foolproof, and errors may occur, but this would be infrequent.

Because of the electronic nature of the process of this invention, the manual errors inherent in the traditional batch processing Lockbox systems are eliminated, along with the expensive labor for data entry that creates the errors in the first place and creates the need for additional expensive labor to locate and reconcile the errors.

The apparatus of the invention includes a suitable transport, to move the CPI from station to station; an optical character reader to read the CPI and identify the Bill Payer, as well as the amounts to be paid and the Designated Date for each Biller; means to imprint an identifying number on each CPI and to associate that number with the electronic record of the transaction; an optional imaging means to capture and store an electronic image of the CPI; and a suitable computer system to store the Pre-Registered information, associate it with the records from the CPI and create the Electronic Remittance Instruction to effect the necessary credits and debits through the ACH and to send necessary information to the Biller's "application".

BENEFITS OF THE INVENTION

The invention provides significant benefits to the Bill Payer and to the Biller. In addition, the invention provides an opportunity to the Payer's Bank to create a new source of revenue, by charging Billers for its services. The Payer's Bank can also reduce the cost of the practice of the invention by the use, in slow business periods, of personnel at local bank branches who are under-utilized part of the time.

Some Lockbox banks will lose business in the process of implementation of the invention. That lost business will flow to the Payers' Banks and will result in more efficient, lower cost Remittance-processing, lower handling costs to the Biller, and quicker access to funds for the Biller. This occurs because the manual labor and errors of batch processing by Lockbox banks are reduced or eliminated. Because Lockbox services are often provided as accommodations to large customers, Lockbox banks may not even be unhappy to lose this business.

To be more specific, the advantages to the Biller are:

1. Quicker collection of payments is possible, since less time is taken for a payment instruction to go from the Bill Payer to its (usually) local Payer's Bank than to a Lockbox. If funds are available, they may be transferred either immediately or upon the Designated Date, with more prompt availability of funds to the Biller, using an Automated Clearing House.

2. The process of this invention is cheaper, because the cost of processing Bill payments with the invention is much less than by the use of a Lockbox, due to the elimination of a lot of the manual operations and errors inherent in the Lockbox process.

3. The process of the invention avoids checks being lost and separated from the associated Remittance Advice, which often occurs with manual handling, particularly when there is no account number written on the check or when a Remittance Advice is unreadable.

4. The invention eliminates returned items, for example, checks for which there are insufficient funds in the Bill Payer's account, since the Payer's Bank simply does not make the payment in that event; the processing costs are therefore lowered.

5. The invention allows the Biller to obtain more predictable cash flow, since it will often know in advance the Designated Dates upon which payments which are processed through the system of the invention are to be received by the Biller.

6. The invention removes the need and cost to provide return envelopes to Bill Payers who use the invention.

The advantages to the Bill Payer are:

1. Postage is saved. If, for example, a Bill Payer mails out fifteen Remittances and Remittance Advices a month, fifteen stamps are replaced by one stamp for the CPI. Postage is eliminated altogether if the Bill Payer delivers the CPI to the Payer's Bank.

2. Other savings are effected. For example, if the Bill Payer provides envelopes, this is eliminated; if telephones and/or computers are used for Computer Initiated Entry, the telephone or bulletin board cost of the CIE is eliminated.

3. The process of the invention is easier to effect and much less time-consuming. Instead of the cumbersome process of filling out a number of checks, and (in some instances) envelopes having to be addressed, all that has to be done is to fill out the amounts of the payments and Designated Dates on the CPI.

4. The system of the invention is more convenient to the Bill Payer, because of its speed and ease of use.

5. The process of the invention can provide better cash flow. Many Bill Payers write out and mail all checks at a given date, usually at the beginning of the month. Since some Bills do not need to be paid until later in the month, the Bill Payer loses the interest on interest-bearing accounts. This is avoided by the invention, when the Designated Date is the due date.

6. The system of the invention minimizes returned checks and their attendant costs—when there are insufficient funds in the Bill Payer's account—since processing is so much easier for the Payer's Bank.

7. The cost, to the Bill Payer, for acquiring blank CPIs could be less than the printer's charges for blank checks.

The advantages of the invention to the Payer's Bank are:

1. The opportunity to provide a new service for a fee and to profit from that. The higher fee (due to higher cost) charged by a Lockbox bank to a Biller may be replaced by lower fees (due to much lower costs) charged by the Payer's Bank to the same Biller while the Payer's Bank makes a profit. Lockboxes are handled by a limited number of banks. This invention expands the profit-making horizons for more banks (of course, at the expense, in part, of those banks that have large Lockbox businesses). However, since Lockbox businesses may be break-even or money-losing operations, sometimes done for the convenience of large clients, Lockbox banks may not be unhappy about losing the business and they can themselves operate as Payer's Banks.

2. The Payer's Bank is in control of the payment system. Thus, the Payer's Bank can more easily predict and therefore control this aspect of its own cash requirements to meet depositors' needs. For example, if a Payer's Bank receives an unpredictable number of checks deposited for collection against it, it may have to borrow federal funds to meet an unexpected need. Predictability reduces this problem and its attendant cost.

3. The Payer's Bank is less likely to have to deal with returned items (bounced checks) and can, therefore, operate more efficiently.

4. The Payer's Bank does not have to process and handle checks it has paid to other banks against the account of the Bill Payer.

5. The Payer's Bank does not have to handle and return as many checks of the Bill Payer, because there are fewer or no checks to return, depending on whether all of a Bill Payer's payments are handled by the CPI.

6. A Payer's Bank may also be a Biller to the Bill Payer. For example, a Bill Payer may have a first mortgage, second mortgage, VISA or MasterCharge account or car loan account with the Payer's Bank. Customers often want to pay these Bills at their local branch of the Payer's Bank. Because of paper-handling complexities, the Payer's Bank does not want these Bills to be paid at its local branches. However, with this invention, these Bills can be handled on the Bill Payer's CPI and electronically processed when the CPI is delivered to the local branch.

7. Printed blank checks are purchased by banks from an outside vendor. Since the Payer's Bank may create the CPIs, this can be an additional revenue source.

OBJECTS OF THIS INVENTION

It is, therefore, an object of this invention to create a process for Bill payment, which allows the Biller to receive funds more quickly, more predictably and less expensively.

Another object of this invention is to provide a Bill payment process which is easier to use and less expensive for the Bill Payer.

Still another object of this invention is to provide a Bill payment process and system which is more completely automated than prior art systems, and relies, in part, on existing automated payment processing capabilities of the banking system.

A concomitant object of this invention is to provide an apparatus for accomplishing the foregoing results.

A further object of this invention is to provide a Bill payment envelope and form instruction which permits the process of the invention to be efficiently and effectively utilized.

Yet another object of this invention is to provide a system which permits (but does not require) distributed bank processing of the CPIs, whereby bank branches may use personnel at slow business periods to process CPIs.

An additional object of this invention is to replace the expensive, labor-intensive manual handling of checks and Remittance Advices in current Lockbox systems with an electronic system which is faster, cheaper and much less susceptible to errors.

An other object of this invention is to create a uniform set of protocols for each Bill Payer, so that transactions for different parts of one Biller's business may be handled efficiently and easily.

These and other objects of the invention will be appreciated from the following detailed description of the invention, when considered in light of the accompanying drawings.

DETAILED DESCRIPTION OF THE INVENTION

The Customer Payment Instruction

Figure 1:
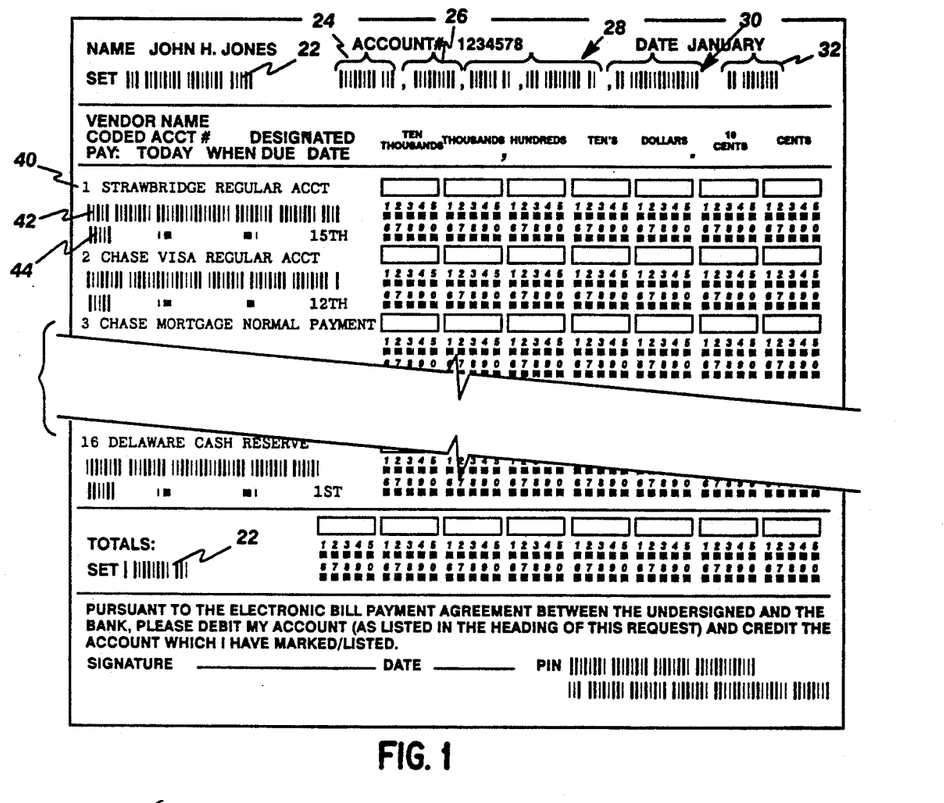
FIG. 1 is a fragmentary schematic representation of the Customer Payment Instruction of the instant invention, in a preferred embodiment.
Figure 2:
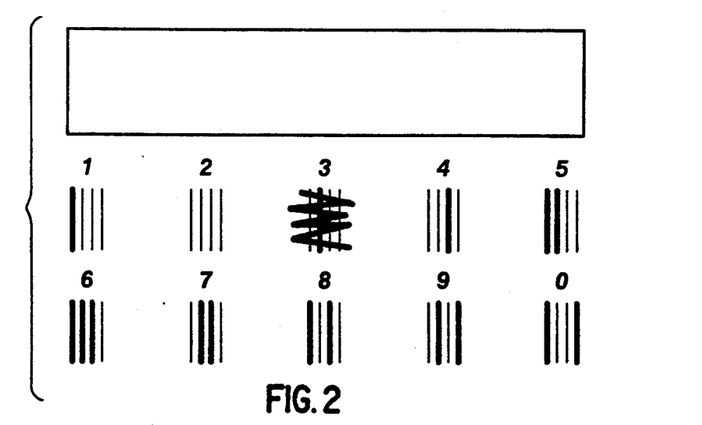
FIG. 2 is an enlarged view of a portion of FIG. 1, the preferred embodiment.

As seen in FIG. 1, the CPI constitutes one or more sheets of paper (preferably 8½"×11"), on which is preprinted the information described below. If the Bill Payer's needs exceed one page, multiple pages of CPI may be used. If more than one page is used, it is preferred to use a separate envelope for each page of CPI used. This allows each CPI to be processed semi-automatically, in its envelope, in the optical character reader as discussed below.

On the top of the CPI is printed the Bill Payer's name in English (or other language) and the customer account number with the Payer's Bank. Optionally, the month of the instructions may be included.

On the upper and lower left-hand sides of the CPI bar codes or other print indicators 22 are printed. The bar codes 22 act as registers, to orient the CPI when placed in the optical scanning unit, to assure proper registration.

Next to the bar code register 22, at the top of the CPI, are the Payer's Bank routing and transit number 24; the Bill Payer's account number at the Payer's Bank 26; the CPI number (if there is more than one CPI for the instruction period) 28; other Payer's Bank required data (e.g., the branch location from which the CPI originated) 30; and the code 32 designating whether the CPI is to be returned to the Bill Payer after it is processed. As seen in FIG. 1, these are written in bar code or other machine-readable form.

Information about each Biller occupies three lines on the CPI. Line 40 contains the Biller's name and a designation of the account involved (e.g., Regular Account).

The first bar coded line 42 after each Biller's name 40 identifies that Biller's account number at the Payer's Bank. In lines 42 and 44 are seven sets of bar coded lines, ten bar codes for each set, to designate the amount of the payment, up to $99,999.99, for example. If eight-digit numbers are to be represented, more sets of bar codes are added to the CPI. Considering the present state of character recognition technology, and of handwriting recognition technology, the only completely accurate method for reading encoded numerals is the use of bar codes. Accordingly, for each unit of the payment number, ten sets of bar codes are provided. The Bill Payer would then, using any pen or pencil, cover the appropriate bar codes (one bar code for each unit) so they will not be read by the optical scanner. The scanner then "reads" the uncovered bar codes for each digit and determines the crossed-out digit accordingly.

There are two other bar code sets listed beneath the account name and number, in line 44, to indicate pay "today" or pay "when due". "Pay today" means that the Payer's Bank should pay the sum as soon as it receives and processes the CPI. Pay "when due" indicates that the sum should be paid on the printed designated date. One of these will be "penciled over" by the Bill Payer to be selected. Next to these two bar codes is a statement of the due date for that account.

As seen in FIG. 1, the CPI contains sufficient information to designate, to the Payer's Bank, all of the necessary information to pay Pre-Registered Bills for the Bill Payer. This constitutes necessary information about each Biller, including its name, its account number with the Payer's Bank, the Bill Payer's account number, the date upon which the payment is due, and the amount of the payment. Thus, once the scanner has read the bar codes on the CPI, it has determined, from the scan and from the memory of the Payer's Bank's computer, for that Bill Payer:

1. The identity of each Biller to be paid;
2. When the Biller is to be paid (Designated Date);
3. How much the Biller is to be paid; and
4. To which account of the Biller the Bill Payer's payment is to be credited.

If no payment amount or Designated Date is provided on the CPI for a Biller, no transaction may be completed for that Biller.

From the information obtained from the Bill Payer's CPI, the transaction information for a Biller to be paid is matched to data stored in the Payer's Bank's file, for the Payer's Bank to determine:

1. The bank routing and transit number for the Biller; and
2. The electronic data conventions to be used in building the Electronics Remittance Advice for that Biller.

This information allows the Payer's Bank to generate an ACH transaction record (for the purpose of creating the credit entry to the Biller's Bank) and creating an ACH transaction addenda record, i.e., Electronic Remittance Advice.

These records, determined from the CPI and Payer's Bank's records, may then be processed electronically against the Bill Payer's account balances, to determine if sufficient funds are available for the payments to be made. If funds are available for payment, the instructions for the transactions can then be transmitted electronically into the Payer's Bank's computer system. Once this information has been stored in computer memory for the Payer's Bank, and assuming that sufficient funds are available in the Bill Payer's account, the bank can promptly provide an electronic transaction through the ACH to effect a debit to the Bill Payer's account, provide a payment instruction to the Biller's application and a credit to the appropriate bank account of the Biller, each in the amount of the sum authorized by the CPI.

In the practice of this invention, it is preferred, for the convenience of the Payer's Bank, to print out a twelve-month or longer supply of CPIs, to be provided to the Bill Payer with a twelve-month supply of CPI mailing envelopes. The CPIs could, if desired, be printed at the local branch of the Payer's Bank, using conventional computer printers, as part of the effort to distribute the CPI processing activities among the branches, or they could be printed at a central location.

During the course of the year, the Bill Payer may wish to make account changes, because new accounts may be opened or closed and added to or deleted from the CPI. This would necessitate the Payer's Bank providing the Bill Payer with a replacement or supplemental set of CPI forms for use, once the changed or added information is provided by the Bill Payer to the Payer's Bank by Pre-Registration of new Billers or dropping old Billers.

Figure 3:
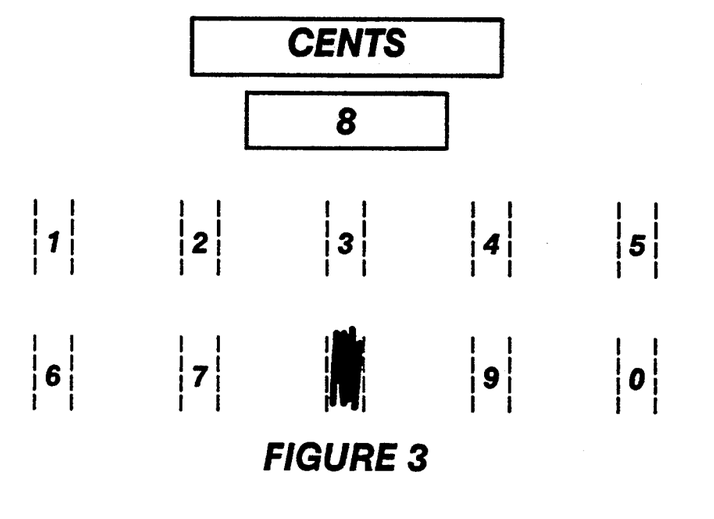
FIG. 3 shows another machine-readable way of presenting numbers.
Figure 4:
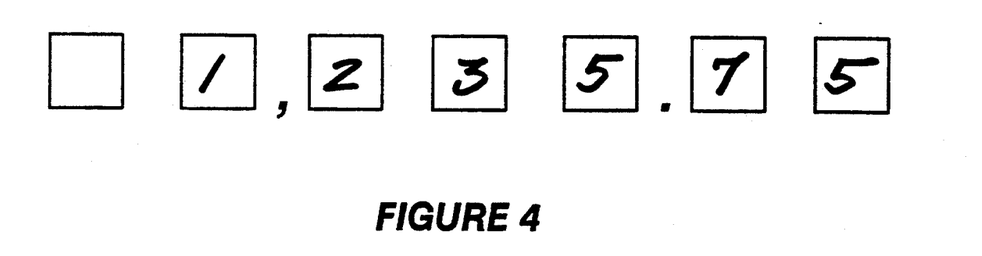
FIG. 4 shows the use of manually written numbers on the CPI.
Figure 5:
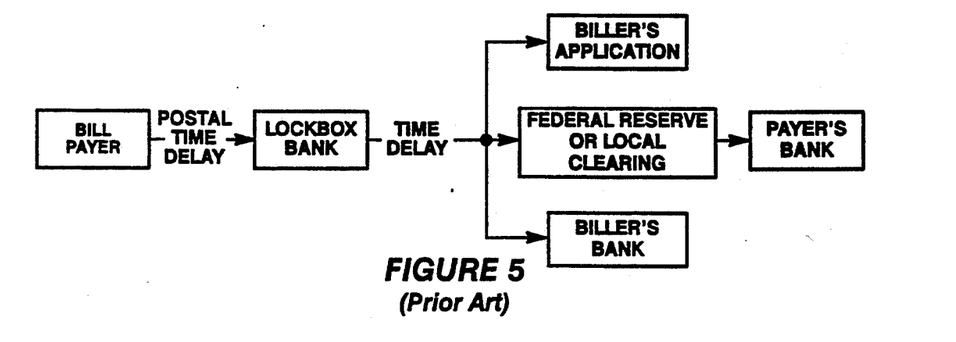
FIG. 5 is a schematic representation of the prior art Bill paying system, normally used for collecting Remittance Advice payments.

It is to be clearly understood that, although bar code identification of indicia is disclosed in FIG. 1, it is within the purview of this invention to use any other manually insertable or otherwise designatable, machine-readable description of the amounts due and Designated Dates. By way of example, FIG. 3 shows a different type of machine-readable indicia, where the Bill Payer fills in the space between the lines designating each appropriate digit. FIG. 4 shows handwritten digits, with printed boxes which act as constraints for the digits, to facilitate optical reading. Handwriting recognition equipment and software exists to read manually inserted Arabic numerals. However, currently available equipment and software are significantly less than 100% accurate, and, therefore, not desirable to be used at this time. At a later date, when the handwriting recognition techniques are improved, it may be preferable to use manually inserted Arabic numerals to designate amounts payable and Designated Dates. Any other commercially acceptable machine-readable technique can also be used to designate payment amount and Designated Date.

The Envelope

Figure 9:
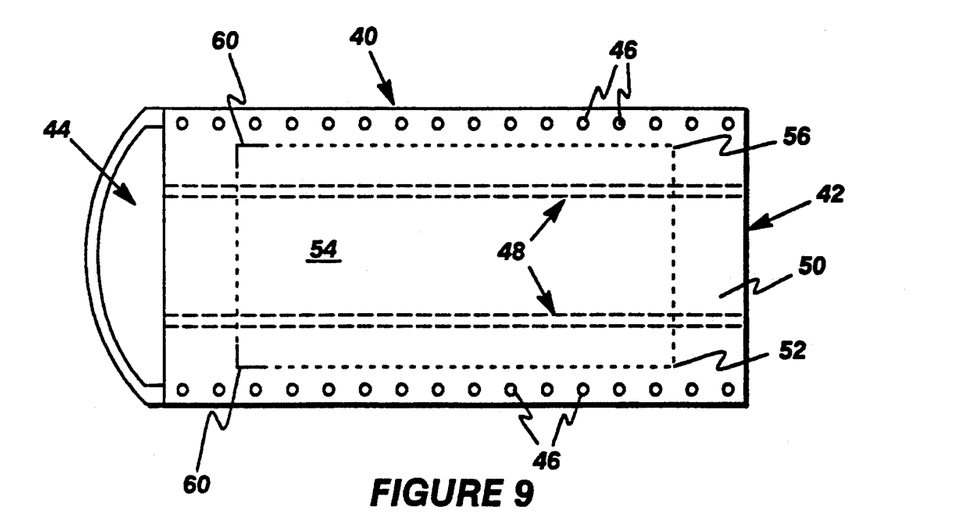
FIG. 9 is a bottom plan view of the back of an envelope, containing a removable window, in a preferred embodiment of this invention.

FIG. 9 illustrates an envelope 40, which is preferably slightly bigger than 8½"×11" in overall dimensions, having a suitable body 42 and adhesive end flap 44. On either side of the envelope 40 may be spaced circular apertures 46, to be engaged by suitable sprockets 72 on a transport mechanism in the CPI transport reader, more fully described below.

Inside the envelope 40, there may optionally be one or more strips of pressure-sensitive adhesive 48, for the purpose of holding the CPI firmly in place, after it is inserted. This immobilizes the CPI, for easier reading in the transport-reader of this invention.

Lastly, the rear surface 50 of the envelope 40 (the side that does not contain addressee information or postage) of the envelope 40 contains a series of perforations 52 which define a viewing window 56 when the window cover 54 is removed. In each of the two left-side corners of window 56, the spacing between perforations defines L-shaped tabs 60 to facilitate engaging and removing the window cover 54.

It is preferred to read the CPI when it is still in the envelope, to avoid the need for removal and facilitate handling. This is simply a labor-saving and cost-saving expedient. Because the CPI contains confidential information of the Bill Payer, it is not desirable to have a transparent window in the envelope 40. The envelope 40 is designed so that the window cover 54 is opaque and is easily removable, by engaging one or both tabs 60, to expose the CPI for reading by a suitable transport-reader mechanism.

Although it is preferred to use the removable-window cover envelope 40 in the practice of this invention, it is within the scope of this invention to use conventional envelopes. The Payer's Bank could then use envelope-opening and sheet-removing mechanisms, of a type which is well known in the art, or manual means, to open the envelope and remove the CPI contained therein. If the CPI is to be removed, there is no need for adhesive strips 48 and no need for registration holes 46 in the envelope.

The Lockbox Process of the Prior Art

FIG. 3 illustrates the current Lockbox system used for the payment of most Bills. The Biller sends the Bill (usually monthly) to the Bill Payer, indicating on the Bill the amount owing and the minimum amount which may be paid. The Bill Payer removes the Remittance Advice (the portion which is to be returned to the Biller) and writes a check or obtains a money order, payable to the Biller, in the amount of the sum required or desired to be paid. The check or money order is preferably manually marked with the Bill Payer's account number, in case it is separated from the Remittance Advice or is dishonored, and mailed in an envelope (sometimes provided by the Biller, sometimes not) to an address designated by the Biller. The address is usually a post office box, where the envelopes are picked up, several times a day, by the Lockbox bank.

A Biller's Lockbox bank may serve the entire country or a large part of the country. Usually, a large national concern has Lockboxes in four or five locations. It may take two, three or more days for the payment to be received by mail at the Lockbox bank than at a local bank (to the Bill Payer), where the payment may be delivered personally or where mail is speedier. Large Lockbox banks often have pickups every hour or so, from locations at the local airport (with the attendant expense) to try to get the envelopes into the production process as soon as possible. When the envelopes are received, they are opened and each check and Remittance Advice removed.

As described above in detail, Lockbox banking is a time-consuming process, because of the delay in delivery of the check from the Bill Payer to the Lockbox bank and from the Lockbox bank to the Payer's Bank, as well as the necessity for handling two pieces of paper (the Remittance Advice and check), manually determining the amount of the payment and handling each piece of paper (that is, two pieces of paper together) and doing manual reconciliations of the inevitable errors in the use of the system.

This is also a relatively slow, inefficient and expensive process, yet it is the most commonly used process for making payments to Billers.

Figure 6:
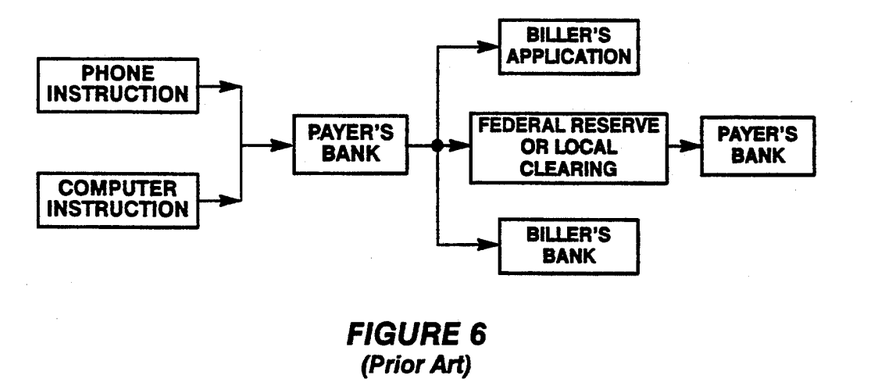
FIG. 6 is a schematic representation of the prior art consumer-initiated entry Bill-paying system.
Figure 7:
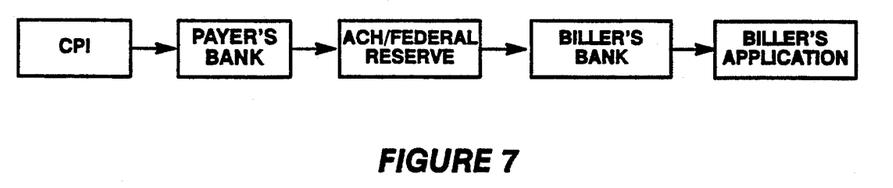
FIG. 7 is a schematic representation of the preferred Bill payment and collection process of this invention.

FIG. 6 illustrates another prior art process, involving the use of Customer Initiated Entries. In this process, the customer uses a rotary telephone, a digital telephone or a computer. In each instance, the Billers are Pre-Registered with the Payer's Bank.

If a rotary phone is used, the Payer's Bank is phoned and the relevant Bill payment information is provided orally.

If a digital phone is used, the Payer's Bank is phoned and the relevant Bill payment information is communicated in response to recorded instructions, using the phone keypad, or orally.

If a computer is used, a network service, such as Prodigy, is dialed and the relevant Bill payment information is communicated by the computer, in response to screen instructions. Some banks offer these services to their customers.

In each instance, using CIE, the Payer's Bank receives the instructions, identifying the Biller and the amount of payment. The funds are usually transferred to the Biller's bank by issuance of one check covering multiple Bill Payers and a listing of all payments going to the Biller, listed by each Bill Payer. These are then mailed to the Biller. In some instances there is an electronic transfer of funds and Electronic Remittance Instructions to the Biller but this is infrequent and often uses a proprietary network of the Payer's Bank. Consequently, CIE is usually slow, cumbersome and expensive and has not received widespread usage.

THE PROCESS OF THE INVENTION

In the practice of the process of the invention, the Payer's Bank initially provides the Bill Payer with information and CPI registration forms necessary to initiate use of the process. The Bill Payer then requests suitable information from each of his, her or its Billers. The Biller provides the Bill Payer with the necessary Pre-Registration information, so the Bill Payer can Pre-Register this information with the Payer's Bank. This information is then loaded into the Payer's Bank's computer data processing system, the details of which are well within the scope of the person having ordinary skill in the art.

The Payer's Bank notifies the Biller's bank that the Bill Payer will now be paying Bills through the CIE system of this invention, pursuant to ACH rules. The Biller's Bank and the Payer's Bank act within the ACH rules regarding the CIE in all future transactions involving the Bill Payer. The Pre-Registered information will include all of the necessary account information and monthly Bill payment due dates, which are entered for each Biller and for that Bill Payer and his, her or its account. The Payer's Bank may then create, using the information now in its computer memory, the appropriate CPIs for that Bill Payer. Each CPI lists, in a predetermined order for each Bill Payer, the Billers and identifying account information for each Bill Payer. The CPIs may, if desired, be printed on a suitable printer located at the local branch of the Payer's Bank. These printed CPIs, often one for each month, for individuals, are then sent to the Bill Payer, together with an appropriate number of mailing envelopes, which may be of the type illustrated in FIG. 9, addressed to the Payer's Bank.

On a monthly basis, for example, the Bill Payer will sit down with his, her or its accumulated Bills from the various Pre-Registered Billers. Using a pen or pencil, the Bill Payer will cover the appropriate bar codes on CPI 20 for the digits representing the sum being paid, using the Bills to determine the amounts due, and Designated Dates for each of the respective Billers. When all appropriate bar codes have been covered (to designate an amount and, if desired, an immediate payment Designated Date) and the CPI is thus completed, the CPI is inserted in the appropriate envelope and mailed or delivered to the Payer's Bank or a branch.

If a particular Bill Payer regularly pays Bills in accordance with the system of this invention, the necessity is avoided to fill out many checks (a cumbersome process), provide and address some envelopes (because the Biller does not always provide the mailing envelope) and put postage on each of those envelopes. Instead, one or more CPIs is filled out, quickly and easily, and, if the CPI is not personally delivered to the local branch, one postage stamp is all that is usually necessary to mail the CPI. If one sheet of CPI is not enough for the Bill Payer's Bills, additional sheets may be used. Each is preferably inserted into a separate mailing envelope 40, to avoid the need for removal of the CPI from the envelope, in the preferred embodiment of the invention.

It is within the scope of this invention to place one or more CPIs in a conventional envelope and manually or machine-remove the CPI(s) for subsequent handling by the process of this invention.

Because the Bill Payer may want to keep immediate records of payments, a copy of the CPI can be created when the CPI is filled out by the use of a tear-off duplicating back sheet. Alternatively, a duplicate of the original of the CPI can be returned to the Bill Payer at the end of the month, together with the monthly account statement.

To be sure that the Bill Payer's account is balanced, a total of all payments can be kept (on the CPI if desired) and the information entered into the Bill Payer's checkbook. Also, the Payer's Bank statement for the Bill Payer can include data regarding the details (account numbers, etc.) which would support payment of the Bill, and this could be evidentiary of the payment.

When the Payer's Bank receives the completed CPI, it is transmitted to a CPI processing area in the bank, in which equipment, which may be constructed as set forth in FIG. 6, processes the CPIs.

The steps involved in the processing are the following:

The window cover 54 is first manually removed. The closed envelope 40 is then placed in a bin 76 or other feed device and delivered on a transport 70 to a first station 78. Alternatively, conventional envelope-opening and insert-removing machinery, of a type which is well known in the art, could be used to remove the CPI, or the window could be removed manually before insertion in the transport.

Figure 8:
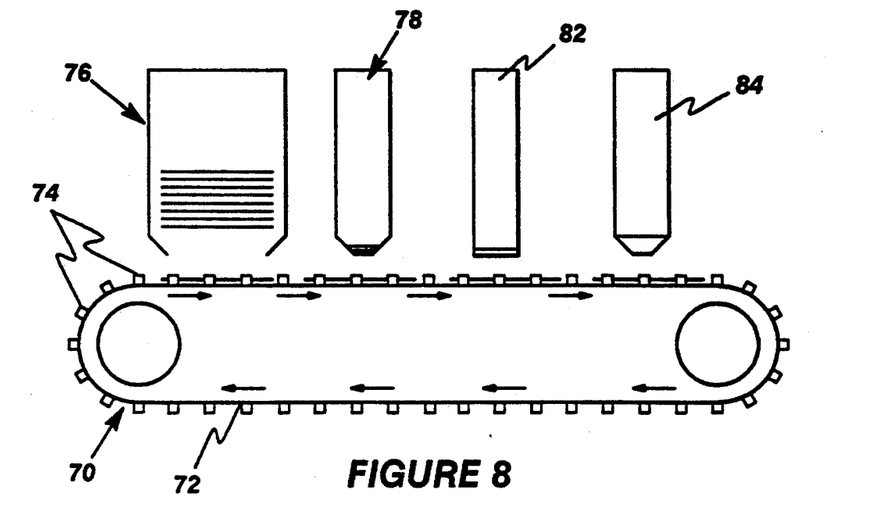
FIG. 8 is a schematic vertical cross-sectional view of a preferred apparatus of this invention.

If the envelope of FIG. 9 is utilized, and the window cover 54 is removed, the envelope is inserted in the transport-reader shown in FIG. 8 and transported, optionally using sprockets 74 on a conveyer 72 which engage the holes 46 on either side of the envelope, with the rear surface 50 facing up, so that the entire CPI is visible through the window 56.

The envelope 40 is transported to a first station, at which an optical scanner 78. After checking the orientation of the CPI using the indicia 22 printed on the CPI scanner 78, will read (1) the Bill Payer's account number with the Payer's Bank, on the top of the CPI, and (2) each Biller's account number and the corresponding bar coded (or otherwise presented) Bill payment amount for that Biller. The Bill Payer's account number information, when transmitted to the Payer's Bank's computer, allows the records for that Bill Payer to be retrieved from computer memory. These records include the necessary information regarding each Biller and may include the position of the Biller on the CPI, so that the position of each bar coded entry determines which Biller that bar coded entry represents. Those entries are then identified by the Payer's Bank, and, if the Designated Date is not the date of receipt of the CPI by the Payer's Bank, the instruction can be stored for payment at a later date, in accordance with the Payer's Bank's computer program for implementing the invention.

The optical character reader may be a commercial type of reader, as is well known in the art, for reading bar coded or other machine readable information. The details of the optical reader do not form a part of this invention, and are within the purview of the skilled artisan.

Although the most efficient and reliable way of reading individually "written" numbers is the use of bar coded information, hand-writing recognition algorithms have been developed which are relatively accurate. Once they have attained a degree of accuracy which renders them commercially acceptable for banking purposes, handwritten characters or other types of machine-readable encoding systems are well within the purview of this invention.

At the next station 82 in the process, each CPI is marked with a suitable identifying stamp or other imprinting mechanism to record and number each CPI, and to associate that record with the computer record of the CPI which is transported. This identification is electronically stored in the Payer's Bank's record of the transaction.

At the last station 84, which is optional, a scanner can retain and store in computer memory, if desired, a copy of the entire CPI image. The original CPI can then be discarded, if desired, and the image used as the Payer's Bank's record, and a copy of the image (or the original) returned to the Bill Payer with his or her monthly bank statement.

The CPIs may then be retained in storage by the Payer's Bank or, if electronically stored, the original discarded or returned to the Bill Payer.

Once the information derived from the Bill Payer's CPI has been scanned and stored in the Payer's Bank's computer, suitable files can be created in the computer. These records will identify the Bill Payer's name and/or account number at the Payer's Bank, the Biller's name and/or account number at the Biller's bank, the Bill Payer's account number with the Biller, the amount to be paid and the Designated Date. This information can be transmitted relatively quickly by the use of ACH or other similar system to the Biller's bank.

Thus, the Biller may have more quickly available funds. The Biller also has the Bill Payer's account information and the amount of the payment, so that the Biller's records can be updated.

Thus, also, since only a single electronic scanning and information capture is involved, for storage in the Bank's computer, the need for manual handling of financial data is completely eliminated in the process.

Description of the Apparatus

The apparatus that forms a part of the invention is illustrated in FIG. 8.

The apparatus may be a small, stand-alone unit that can be manually fed by a single operation. This is preferred, since it allows CPI processing to take place at local bank branches, using personnel time which is—at times—under-utilized, with attendant personnel-utilization efficiencies.

Of course, it may be desired to centralize the process at one or more central bank offices. In that event, the equipment would be substantially the same, but sized to handle much greater CPI throughput. The details are well within the capabilities.

The apparatus, in either event, comprises a suitable transport 70, such as a conveyor belt 72, of a type which is well known in the art. The belt may be formed with sprockets 74 to engage corresponding apertures 46 in each envelope 40, to assure positive feed of the envelopes and their proper alignment.

The envelope may be dropped onto the conveyor belt 70 from a suitable feed hopper 76, of a type which is easy to construct.

The first station is an optical reader 78, comprising suitable reading heads and associated computer hardware and software, to scan the CPI and read the barcoded information and the Bill Payer's identification information. As noted above, as software development improves, the optical reader will be able to read handwritten images, for ease of use of the CPI by the Bill Payer.

Station 82 is a suitable stamping unit, to stamp identifying indicia on the CPI, so that the receipt of the CPI is known and its progress tracked and retrieved. This information is also transmitted electronically to the Bill Payer's computer file, where it is stored with the other transaction information.

The last station 84 is an optional imaging camera to capture a permanent image of the CPI and store that in the Payer's Bank computer, whereupon the CPI may be discarded and destroyed, if desired.

General Summary

It can therefore be seen that the invention is an improved process, apparatus and article for Customer Initiated Entry of Bill payment and Electronic Remittance Instruction processing. A preferred embodiment of the invention has been described, but there are numerous variations in the invention that may be made without departing from the scope of the invention. Also, future technological developments regarding image and indicia recognition, capture, handling and storage will readily permit adaptation of the system and apparatus of the invention, without departing from its spirit and scope. It is to be noted that all of the programming necessary to implement the invention is within the capabilities of the person having ordinary skill in the art, using available equipment and systems. Likewise, the details of the apparatus of this invention, entailing commercially available or readily modified components, is within the capabilities of the skilled artisan.

I claim:

1. An automated Bill payment process for Bill Payers, comprising the steps of:
   (a) Storing in computer memory of a financial institution Pre-Registration information for all Billers to be paid from the account of each Bill Payer;
   (b) Collecting completed Customer Payment Instructions from Bill Payers;
   (c) Scanning each CPI to identify, as to each Bill Payer, (i) the amount to be paid to each Biller, and (ii) if applicable, the Designated Date;
   (d) Electronically creating a bank debit for each Bill Payer's account, for the amounts designated on the CPI for the Bill Payer; and
   (e) Electronically creating a bank credit for each Biller for the amount designated on the CPI for that Biller; and
   (f) Electronically creating the record containing the Bill Payer's account number with the Biller, along with other appropriate billing data and the date of credit of the Biller's account, and transmitting the record to the Biller.

2. A process as set forth in claim 1, in which steps (d), (e) and (f) are accomplished through an Automated Clearing House.

3. A process as set forth in claim 1, including, after step (a), the step of producing and delivering to the Bill Payer one or more Customer Payment Instructions, each listing sequentially the names or other identifying indicia for each Biller and having a location for manual indication of an amount to be paid to that Biller and the Designated Date.

4. A process as set forth in claim 1, wherein the amount is identified by bar codes and ten bar codes represent each digit option.

5. A process as set forth in claim 1, wherein the amount is identified by Arabic numerals.

6. A process as set forth in claim 1, wherein each Customer Payment Instruction includes the name or other identifying indicia for the Bill Payer.

7. A process as set forth in claim 1, including the step of imprinting an identifying code on the CPI and storing the identifying code in the computer memory of the Payer's Bank with the other information read from the CPI.

8. A process set forth in claim 1, including the step of manually feeding the CPIs to step (d).

9. A process as set forth in claim 1, in which the completed CPIs are collected at the Bill Payer's local financial institution and manually processed for introduction to step (c).

10. A process as set forth in claim 1, including the step of creating and storing an optical image of the CPI.

11. A system for electronically processing payments from a Bill Payer to a Biller comprising:
   (a) Means for electronically reading digit-designating indicia on Customer Payment Instructions which identify the amount of a payment to be made by a Bill Payer to a Biller; and
   (b) Means for creating the Electronic Remittance Instructions and transferring payments and records of each payment in accordance with the CPIs to the appropriate Billers.

12. A system as set forth in claim 11, including the following:
   (a) Means for entering in the computer memory of a Payer's Bank Pre-Registration data identified for each Bill Payer and each corresponding Biller; and
   (b) Means for producing Customer Payment Instructions personalized for each Bill Payer by Biller.

13. A system as set forth in claim 11, including means to store an image of each CPI.

14. A system as set forth in claim 11, including means to imprint identifying indicia on each CPI and for storing that indicia in computer memory in the same file as the information read from the CPI.

* * * * *